United States Patent
Throop et al.

(10) Patent No.: US 8,924,681 B1
(45) Date of Patent: Dec. 30, 2014

(54) SYSTEMS, METHODS, AND COMPUTER READABLE MEDIA FOR AN ADAPTATIVE BLOCK ALLOCATION MECHANISM

(75) Inventors: Dean D. Throop, Efland, NC (US); Miles A. de Forest, Bahama, NC (US); Samuel Mullis, Raleigh, NC (US); Dean Herington, Hillsborough, NC (US); David Haase, Fuquay Varina, NC (US)

(73) Assignee: EMC Corporation, Hopkinton, MA (US)

( * ) Notice: Subject to any disclaimer, the term of this patent is extended or adjusted under 35 U.S.C. 154(b) by 165 days.

(21) Appl. No.: 12/751,685

(22) Filed: Mar. 31, 2010

(51) Int. Cl.
*G06F 12/16* (2006.01)
*G06F 3/06* (2006.01)

(52) U.S. Cl.
CPC ............ *G06F 3/0631* (2013.01); *G06F 3/0665* (2013.01)
USPC .......................................... 711/170; 711/114

(58) Field of Classification Search
None
See application file for complete search history.

(56) References Cited

U.S. PATENT DOCUMENTS

| | | | |
|---|---|---|---|
| 5,604,902 A | 2/1997 | Burkes et al. | |
| 6,681,242 B1 | 1/2004 | Kumar et al. | |
| 6,880,062 B1 | 4/2005 | Ibrahim et al. | |
| 7,284,244 B1 | 10/2007 | Sankaranarayan et al. | |
| 7,340,522 B1 | 3/2008 | Basu et al. | |
| 7,406,484 B1 | 7/2008 | Srinivasan et al. | |
| 7,463,648 B1 | 12/2008 | Eppstein et al. | |
| 7,480,912 B2 | 1/2009 | Arnold et al. | |
| 7,577,692 B1 | 8/2009 | Corbett et al. | |
| 7,702,873 B2 | 4/2010 | Griess et al. | |
| 7,814,128 B2 * | 10/2010 | Silvers et al. | 707/812 |
| 7,849,180 B2 * | 12/2010 | Sawyer et al. | 709/223 |
| 8,140,821 B1 | 3/2012 | Raizen et al. | |
| 8,191,125 B2 | 5/2012 | Dellow et al. | |
| 8,407,445 B1 | 3/2013 | Pathak et al. | |
| 8,443,163 B1 | 5/2013 | Bailey et al. | |
| 8,443,369 B1 | 5/2013 | Bailey et al. | |
| 8,473,678 B1 | 6/2013 | Rajasekaran et al. | |
| 8,745,327 B1 | 6/2014 | Throop et al. | |
| 2001/0049779 A1 * | 12/2001 | Shimada et al. | 711/205 |
| 2003/0056073 A1 | 3/2003 | Zeiger | |
| 2003/0131165 A1 * | 7/2003 | Asano et al. | 710/74 |
| 2004/0039891 A1 * | 2/2004 | Leung et al. | 711/165 |
| 2004/0054850 A1 * | 3/2004 | Fisk | 711/112 |
| 2004/0098537 A1 * | 5/2004 | Serizawa | 711/112 |
| 2004/0153606 A1 * | 8/2004 | Schott | 711/114 |
| 2004/0181476 A1 | 9/2004 | Smith et al. | |

(Continued)

OTHER PUBLICATIONS

Non-Final Official Action for U.S. Appl. No. 12/100,514 (Jan. 31, 2012).

(Continued)

*Primary Examiner* — Kaushikkumar Patel
(74) *Attorney, Agent, or Firm* — Jenkins, Wilson, Taylor & Hunt, P.A.

(57) ABSTRACT

Systems, methods, and computer readable media for an adaptive block allocation mechanism are disclosed. According to one aspect, a method for allocating slices of storage in a storage medium based on scores is disclosed. The method occurs at a storage processor for controlling access to a storage medium divided into a plurality of logical slices of storage. The method includes determining one or more scores associated with one or more slices. Determining one or more scores includes combining plural dissimilar characteristics of the slice into a single value. The method further includes receiving a slice allocation request, and in response to the slice allocation request, selecting a slice for allocation using the scores.

23 Claims, 6 Drawing Sheets

(56) References Cited

U.S. PATENT DOCUMENTS

| | | | |
|---|---|---|---|
| 2004/0243699 A1* | 12/2004 | Koclanes et al. | 709/224 |
| 2005/0193231 A1 | 9/2005 | Scheuren | |
| 2005/0273556 A1* | 12/2005 | Gellai et al. | 711/114 |
| 2006/0010290 A1* | 1/2006 | Sasamoto | 711/114 |
| 2006/0085471 A1 | 4/2006 | Rajan et al. | |
| 2006/0112247 A1* | 5/2006 | Ramany et al. | 711/165 |
| 2006/0143424 A1 | 6/2006 | Matsuzaki | |
| 2007/0043842 A1 | 2/2007 | Chouanard et al. | |
| 2007/0143563 A1 | 6/2007 | Pudipeddi et al. | |
| 2007/0185934 A1 | 8/2007 | Cannon et al. | |
| 2008/0082593 A1 | 4/2008 | Komarov et al. | |
| 2009/0034107 A1 | 2/2009 | Posamentier | |
| 2009/0064159 A1 | 3/2009 | LaFrese et al. | |
| 2009/0077327 A1 | 3/2009 | Hara | |
| 2009/0089516 A1 | 4/2009 | Pelts et al. | |
| 2009/0248763 A1 | 10/2009 | Rajan et al. | |
| 2009/0276588 A1* | 11/2009 | Murase | 711/160 |
| 2009/0292870 A1* | 11/2009 | Sambe et al. | 711/114 |
| 2009/0307424 A1* | 12/2009 | Galloway et al. | 711/114 |
| 2010/0153641 A1* | 6/2010 | Jagadish et al. | 711/114 |
| 2010/0262802 A1 | 10/2010 | Goebel et al. | |
| 2010/0299495 A1 | 11/2010 | Frank | |
| 2011/0145609 A1 | 6/2011 | Berard et al. | |
| 2011/0191536 A1 | 8/2011 | Mizuno et al. | |

OTHER PUBLICATIONS

Official Action for U.S. Appl. No. 12/164,959 (Sep. 12, 2011).
Commonly Assignedo-pending U.S. Appl. No. 13/168,329 for "Methods, Systems, and Computer Readable Medium for Controlling Prioritization of Tiering and Spin Down Features in a Data Storage System" (Unpublished, filed Jun. 24, 2011).
Final Official Action for U.S. Appl. No. 12/100,514 (May 25, 2011).
Non-Final Official Action for U.S. Appl. No. 12/100,514 (Nov. 16, 2010).
Commonly-assigned, Co-pending U.S. Appl. No. 12/826,434 for "Managing Multi-Tiered Storage Pool Provisioning," (Unpublished, filed Jun. 29, 2010).
Commonly Assigned, Co-pending U.S. Appl. No. 12/826,385 for "Systems, Methods, and Computer Readable Media for Compressing Data at a Virtually Provisioned Storage Entity" (Unpublished, Filed Jun. 29, 2010).
Commonly Assigned, Co-pending U.S. Appl. No. 12/824,816 for "Methods, Systems, and Computer Readable Medium for Co-pending Data Storage Resource Allocation and Data Relocation in a Data Storage Array" (Unpublished, Filed Jun. 28, 2010).
Commonly Assigned, Co-pending U.S. Appl. No. 12/164,959 for "Methods, Systems, and Computer Readable Medium for Dynamic, Policy-Based Allocation of System Resources" (Unpublished, Filed Jun. 30, 2008).
Commonly Assigned, Co-pending U.S. Appl. No. 12/100,514 for "Methods, Systems, and Computer Readable Medium for Allocating Physical Storage in a Storage Array" (Unpublished, Filed Apr. 10, 2006).
Non-Final Office Action for U.S. Appl. No. 12/100,514 (Oct. 15, 2013).
Non-Final Office Action for U.S. Appl. No. 13/168,329 (Oct. 7, 2013).
Final Office Action for U.S. Appl. No. 12/826,385 (Sep. 10, 2013).
Non-Final Official Action for U.S. Appl. No. 12/824,816 (Sep. 14, 2012).
Interview Summary for U.S. Appl. No. 12/751,665 (Aug. 20, 2012).
Final Official Action for U.S. Appl. No. 12/100,514 (Aug. 10, 2012).
Non-Final Official Action for U.S. Appl. No. 12/164,959 (Jul. 24, 2012).
Non-Final Official Action for U.S. Appl. No. 12/826,434 (Jun. 13, 2012).
Applicant-Initiated Interview Summary for U.S. Appl. No. 12/100,514 (Jun. 5, 2012).
Non-Final Official Action for U.S. Appl. No. 12/751,665 (May 8, 2012).
Notice of Allowance and Fee(s) Due for U.S. Appl. No. 12/826,434 (Mar. 7, 2013).
Non-Final Office Action for U.S. Appl. No. 12/826,385 (Mar. 5, 2013).
Interview Summary for U.S. Appl. No. 12/826,385 (Mar. 1, 2013).
Notice of Allowance and Fee(s) Due for U.S. Appl. No. 12/824,816 (Jan. 17, 2013).
Notice of Allowance and Fee(s) Due for U.S. Appl. No. 12/164,959 (Jan. 11, 2013).
Notice of Allowance and Fee(s) Due for U.S. Appl. No. 12/751,665 (Nov. 16, 2012).
Notice of Allowance and Fee(s) Due for U.S. Appl. No. 12/100,514 (Jul. 2, 2014).
Applicant-Initiated Interview Summary for U.S. Appl. No. 12/826,385 (Jun. 26, 2014).
Non-Final Office Action for U.S. Appl. No. 12/826,385 (Feb. 20, 2014).
Final Office Action for U.S. Appl. No. 12/100,514 (Feb. 6, 2014).
Notice of Allowance and Fee(s) Due for U.S. Appl. No. 13/168,329 (Jan. 27, 2014).

* cited by examiner

SYSTEMS, METHODS, AND COMPUTER READABLE MEDIA FOR AN ADAPTATIVE BLOCK ALLOCATION MECHANISM

TECHNICAL FIELD

The subject matter described herein relates to methods and systems for storage space allocation. More particularly, the subject matter described herein relates to systems, methods, and computer readable media for an adaptive block allocation mechanism.

BACKGROUND

Storage systems may include one or more disk arrays. Disk arrays may use a variety of storage devices with various characteristics for providing storage. Each storage array may logically operate as a unified storage device. While such organization generally allows for a homogenous view of the storage devices, it is sometime useful to organize the various storage devices into tiers or classes of storage. A tier is generally delineated by differences in at least one of the four following attributes: price, performance, capacity and function. For example, tier 1 storage devices may be comprised of storage media that is very reliable and very fast, such as flash memory. Tier 2 storage devices may be comprised of storage media that is slower than tier 1 media but very reliable (e.g., a hard disk). For example, tier 2 storage devices may include high performance disks such as 15,000 RPM Fibre Channel (FC) Disks. Tier 3 storage devices may be comprised of comparatively slower and cheaper storage media than either tier 1 or tier 2, such as 7200 RPM serial ATA (SATA) disks, Storage system may also include one or more storage array processors (SPs) for handling both requests for allocation and input/output (I/O) requests. An SP is the controller for and primary interface to a storage array.

Storage arrays are typically used to provide storage space for one or more computer file systems, databases, applications, and the like. For this and other reasons, it is common for storage arrays to be structured into logical partitions of storage space, called logical units (also referred to herein as LUs or LUNs). For example, at LUN creation time, storage system may allocate storage space of various storage devices in disk array to be presented as a volume for use by a server system. This allows a unified storage array to appear as a collection of separate file systems, network drives, and/or volumes.

Recognizing the fact that more storage space may be provisioned than may actually be used at first, the concept of a sparsely populated or "thin" logical unit (TLU) was developed. Unlike the more traditional "fat" or fully allocated logical unit (FLU), which is created by provisioning and allocating a certain amount of storage area, a TLU is provisioned at creation but is not allocated any storage media until the storage is actually needed. For example, storage media space may be allocated to the TLU upon receipt of an I/O write request from a requesting entity, referred to herein as a "host". Upon receipt of the write request from the host, the SP may then determine whether there is enough space already allocated to the TLU to store the data being written, and if not, allocate to the TLU additional storage space (e.g., a logical portion or slice of free space).

While thin logical units provide distinct advantages over fully allocated logical units (i.e., where the entire storage space requested is actually allocated and reserved for the exclusive use of the requesting entity at LUN creation time), the manner in which the slices are allocated across storage media can have an enormous impact on the performance of the storage system. In particular, traditional block allocation mechanisms generally allocate storage using naïve approaches that do not account for a variety of factors that may affect storage performance. For example, naïve approaches may include a round-robin approach which attempts to allocate space evenly from each storage device and a most-space available approach which allocates space from a storage device with the most space available. Such approaches, however, are not very effective if there are discrepancies between storage devices in the system, especially if such discrepancies become greater as space is allocated. For example, a most-space available approach in a tiered storage system can result in a relatively high percentage of storage space being allocated from a slow storage device with a huge capacity, such as large capacity SATA disks, while faster storage devices (e.g., an enterprise flash drive (EFD)) may go under-utilized or ill-utilized.

Accordingly, in order to avoid potential pitfalls that are inherent in naïve approaches to allocation, there exists a need for an efficient approach to allocation that uses a plurality of factors. Specifically, there exists a need for methods, systems, and computer readable medium for an adaptive block allocation mechanism.

SUMMARY

According to one aspect, the subject matter described herein includes a method for allocating logical slices of storage in a storage medium based on scores. The method occurs at a storage processor for controlling access to a storage medium divided into a plurality of logical portions (slices) of storage. The method includes determining one or more scores associated with one or more slices. Determining one or more scores includes combining plural dissimilar characteristics of the slice into a single value. The method further includes receiving a slice allocation request, and in response to the slice allocation request, selecting a slice for allocation using the scores.

According to yet another aspect, the subject matter described herein includes a system for an adaptive block allocation mechanism. The system includes a storage processor for controlling access to a storage medium divided into a plurality of logical slices of storage. The storage processor includes a scoring function for determining one or more scores associated with one or more slices. Determining one or more scores includes combining plural dissimilar characteristics of the slice into a single value. The storage processor also includes a selection function for receiving a slice allocation request, and in response to the slice allocation request, selecting a slice for allocation using the scores.

The subject matter described herein for an adaptive block allocation mechanism and related methods may be implemented in hardware, software, firmware, or any combination thereof. As such, the terms "function" or "module" as used herein refer to hardware, software, and/or firmware for implementing the feature being described. In one exemplary implementation, the subject matter described herein may be implemented using a non-transitory computer readable medium having stored thereon computer executable instructions that when executed by the processor of a computer control the computer to perform steps. Exemplary computer readable media suitable for implementing the subject matter described herein include computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

Preferred embodiments of the subject matter described herein will now be explained with reference to the accompanying drawings, wherein like reference numerals represent like parts, of which.

DETAILED DESCRIPTION

In accordance with the subject matter disclosed herein, systems, methods, and computer readable media are provided for an adaptive block allocation mechanism.

Figure 1A:
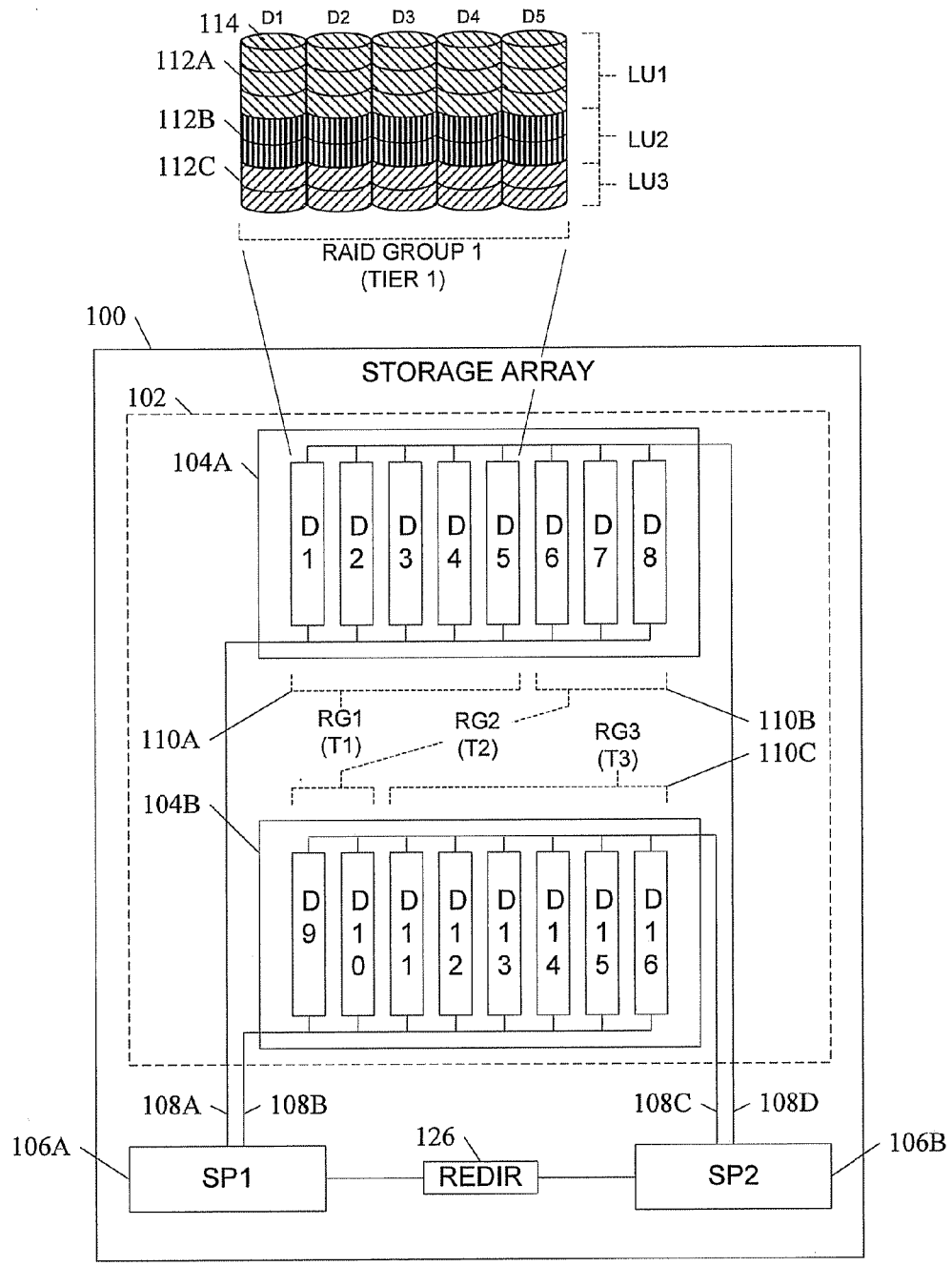
FIG. 1A is a block diagram illustrating a system for an adaptive block allocation mechanism according to an embodiment of the subject matter described herein.

FIG. 1A is a block diagram illustrating a system for an adaptive block allocation mechanism according to an embodiment of the subject matter described herein. FIG. 1A shows a storage system that comprises a storage array 100. Storage array 100 includes multiple storage devices 102, which are typically hard disk drives, but which may be tape drives, flash drives, flash memory, other solid state drives, or some combination of the above. Storage devices 102 may have various differences in capabilities based on physical characteristics of underlying storage media, e.g., flash memory may be extremely fast compared to tape storage which may be relatively large and cheap. As used herein, storage media may also be referred to as physical media. Storage media may include any of various computer readable media, e.g., hard disks, floppy disks, disks, tapes, discs, solid state memory, optical discs, and flash memory. In one embodiment, storage devices 102 may be organized into tiers or classes of storage based on characteristics of associated storage media. For example, flash-based storage device 102 may be tier 1 storage, hard disk-based storage device 102 may be tier 2 storage, and tape-based storage devices 102 may be tier 3 storage.

In one embodiment, the storage devices 102 may be organized into multiple shelves 104, each shelf containing multiple devices 102. In the embodiment illustrated in FIG. 1A, storage array 100 includes two shelves, Shelf1 104A and Shelf2 104B; Shelf1 104A contains eight storage devices, D1-D8, and Shelf2 also contains eight storage devices, D9-D16.

Storage array 100 may include one or more storage processors 106, for handling input/output (I/O) requests and allocations of hosts or server systems. For example, hosts or servers, such as VMWare ESX servers, may be connected to storage processors 106 using FC or Internet small computer system interface (ISCSI) connections. Each storage processor 106 may communicate with storage devices 102 through one or more data buses 108. In one embodiment, storage array 100 contains two storage processors, SP1 106A, and SP2 106B, and each storage processor 106 has a dedicated data bus 108 for each shelf 104. For example, SP1 106A is connected to each storage device 102 on Shelf1 104A via a first data bus 108A and to each storage device 102 on Shelf2 104B via a second data bus 108B. SP2 106 is connected to each storage device 102 on Shelf1 104A via a third data bus 108C and to each storage device 102 on Shelf2 104B via a fourth data bus 108D. In this manner, each device 102 is configured to be connected to two separate data buses 108, one to each storage processor 106. For example, storage devices D1-D8 may be connected to data buses 108A and 108C, while storage devices D9-D16 may be connected to data buses 108B and 108D. Thus, each device 102 is connected via some data bus to both SP1 106A and SP2 106B. The configuration of storage array 100, as illustrated in FIG. 1A, is for illustrative purposes only, and is not considered a limitation of the subject matter described herein.

In addition to the physical configuration, storage devices 102 may also be logically configured. For example, multiple storage devices 102 may be organized into redundant arrays. In one embodiment, redundant arrays comprise redundant array of inexpensive disks (RAID) groups, or RGs 110, shown in FIG. 1A as RG1 110A, RG2 110B, and RG3 110C. RGs may be created or based on a various factors, including proximity of storage devices, utilization goals, capacity needs, physical characteristics of storage devices 102, and other factors. In one embodiment, RGs are based on tiers generally determined by physical characteristics of storage devices (e.g., fast, high quality devices D1-D5 may be tier 1 storage devices, and, as such, may be organized into a given RG 110). Such physical characteristics of storage devices for determining tiers may include but is not limited to capacity of storage device, access speed of storage device (e.g., revolution per minute (RPM) for disk-based media and throughput for solid state media), and type of storage device (e.g., flash, hard disk, and floppy).

In the embodiment illustrated in FIG. 1A, storage devices D1-D5 are tier 1 storage. D1-D5 are organized into a first RAID group, RG1 110A. Storage devices D6-D10 are tier 2 storage. D6-D10 are organized into a second RAID group, RG2 110B. Storage devices D12-D16 are tier 3 storage. D12-16 are organized into a third RAID group, RG3 110C. In one embodiment, a RAID group may span multiple shelves and/or multiple buses. For example, RG2 110B includes storage devices from both Shelf1 104A and Shelf2 104B.

Although RAID groups are composed of multiple storage devices, a RAID group may be conceptually treated as if it were a single storage device. As used herein, the term "storage entity" may refer to either a single storage device or a RAID group operating as a single storage device. In one embodiment, storage entities are associated with tiers or classes of storage.

Storage entities may be further sub-divided into logical units. A single RAID group or individual storage device may contain one or more logical units. In one embodiment, slices are logical units, or portions therein, of storage area. As used herein, storage area refers to storage space of one or more storage entities in a storage system. Slices may be any size and may be associated with storage media from one or more storage entities. In one embodiment, slices are constant-sized portions of storage associated with one storage device 102, or a storage medium therein, in storage array 100 (e.g., a 1 gigabyte (GB) slice from D2).

In the embodiment illustrated in FIG. 1A, RG1, which includes storage devices D1-D5, is sub-divided into 3 logical units, LU1 112A, LU2 112B, and LU3 112C. Each LU 112 is sub-divided into multiple slices.

Figure 1B:
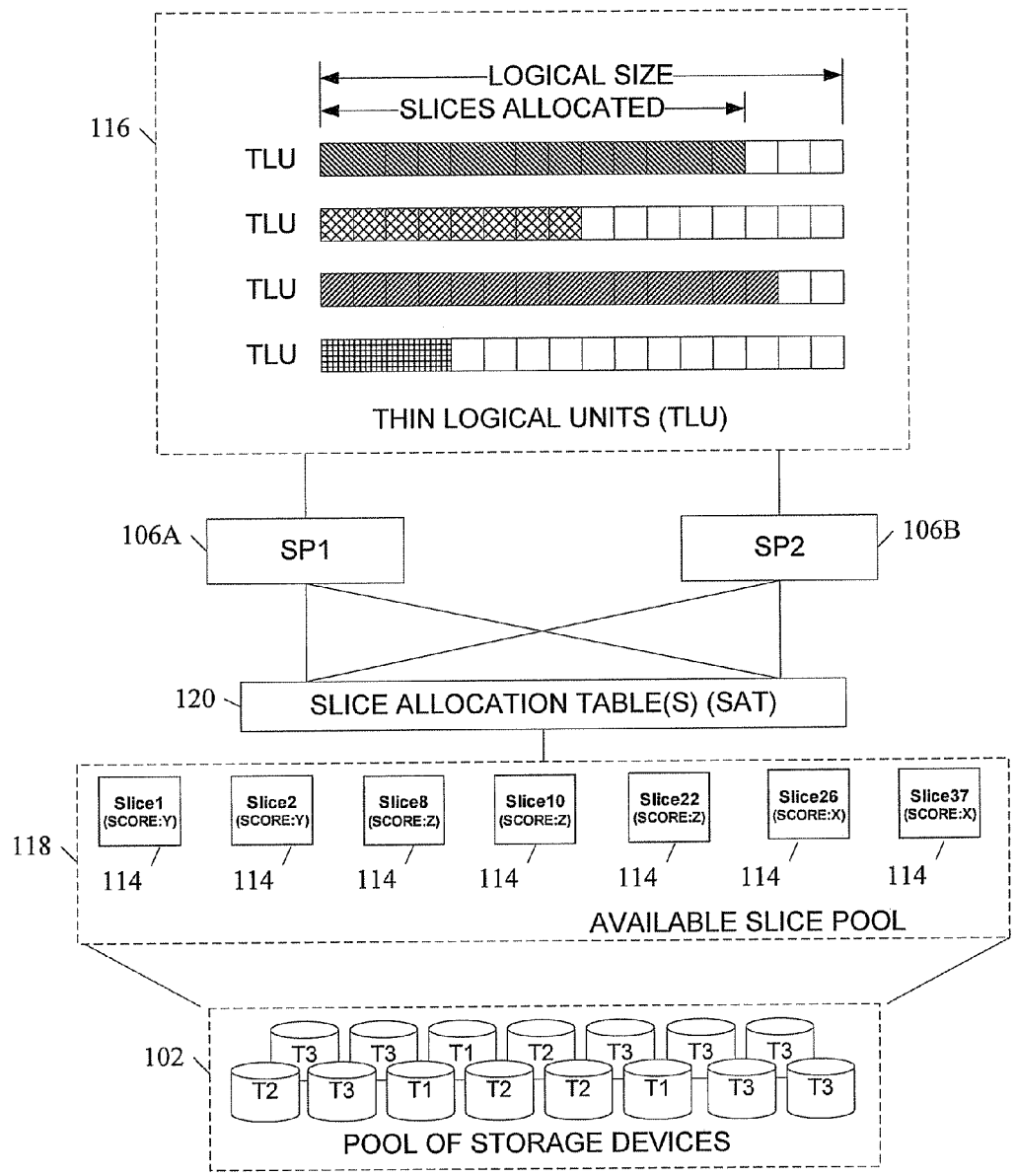
FIG. 1B is a block diagram illustrating another view of a system for an adaptive block allocation mechanism according to an embodiment of the subject matter described herein.

FIG. 1B is a block diagram illustrating another view of a system for allocating storage media in a storage array according to an embodiment of the subject matter described herein. In the simplified view shown in FIG. 1B, a pool of tiered storage devices 102 are shown. As illustrated, each storage device is associated with a tier or storage class level, represented by a T1, T2, or T3 on each storage device 102 in FIG. 1B. The tiered storage devices 102 may be organized into multiple RAID groups. Each RAID group may be further divided into a number of slices 114. TLUs 116 are thin-provisioned LUNs. Each TLU 116 may have a logical size that is larger than the current actual size. The actual size is determined by the number of slices actually allocated to the TLU 116. The slices that are allocated to a TLU 116 may be physically located anywhere in the storage system, e.g., in a storage array.

In one embodiment, storage processors 106 are responsible for allocating storage and maintaining information about how that allocated storage is being used. Storage processor 106 may maintain information about the structure of the file system whose contents are being stored in the allocated slices. One or more slice allocation tables (SATs) may be used for maintaining slice-related information. It will be appreciated that SATs may maintain information in various ways and formats. For example, SATs may include one or more data structures, such as tables, lists, hashes, and other applicable structures. SATs may record information about each slice 114, such as the TLU that is using the slice 114, whether the slice 114 is free or allocated, and one or more scores associated with the slice 114.

In one implementation of a storage system, one or more SATs may be maintained for each storage array or portions therein. For example, each storage device 102 may be associated with one SAT. In other words, each SAT may contain information for all slices of a particular storage device 102. In a second example, each tier or RG 110 may be associated with one SAT. In an alternative implementation of a storage system, one or more SATs may be maintained for an entire storage system, which may include a plurality of storage arrays.

SATs 120 associated with unallocated or available slices 114 may be used by one or more storage processors 106 in slice allocation. In some embodiments, one or more SATs (also referred to herein as a free list or a free slice list) may be used to maintain information about unallocated or available slices in a storage system. In the embodiment illustrated in FIG. 1B, one or more SATs 120 include information about unallocated slices 114 of a slice pool 118. Slice pool 118 includes unallocated slices 114 of storage area from storage devices 102.

It will be appreciated that storage processors 106 may perform allocation using one or more allocation policies (e.g., an allocation policy may determine which storage processors 106 allocate particular storage area and how to determine which storage area to allocate). These policies may also be pluggable (e.g., policies may be implemented dynamically or as directed by a network operator without resetting the storage system or without performing a (re)initialization).

An adaptive block allocation (ABA) mechanism will now be discussed. In one embodiment, storage processor 106, or other system component, may use an adaptive block allocation mechanism for selecting slices 114 for allocation. The ABA mechanism may use scores for determining which slices 114 to allocate. Scores are single attributes that incorporates relevant factors affecting storage performance. In particular, a score for a slice may be determined by combining plural dissimilar characteristics of the slice into a single value or attribute. For example, a score for a slice 114 may be based on factors related to an associated storage device 102, including characteristics of the underlying storage media of storage device 102 (e.g., speed, capacity, and type of a physical disk) and other factors, such as speed of data bus 108, preferences to storage resources (e.g., affinity to a particular LU 112 or storage processor 106), and whether a slice 114 is part of a RG 110 experiences problems (e.g., in a degraded mode). Instead of comparing each relevant factor that may affect storage performance separately, the ABA mechanism may compare slices using the scores, thereby efficiently allocating slices based on optimal storage performance.

Figure 2A:
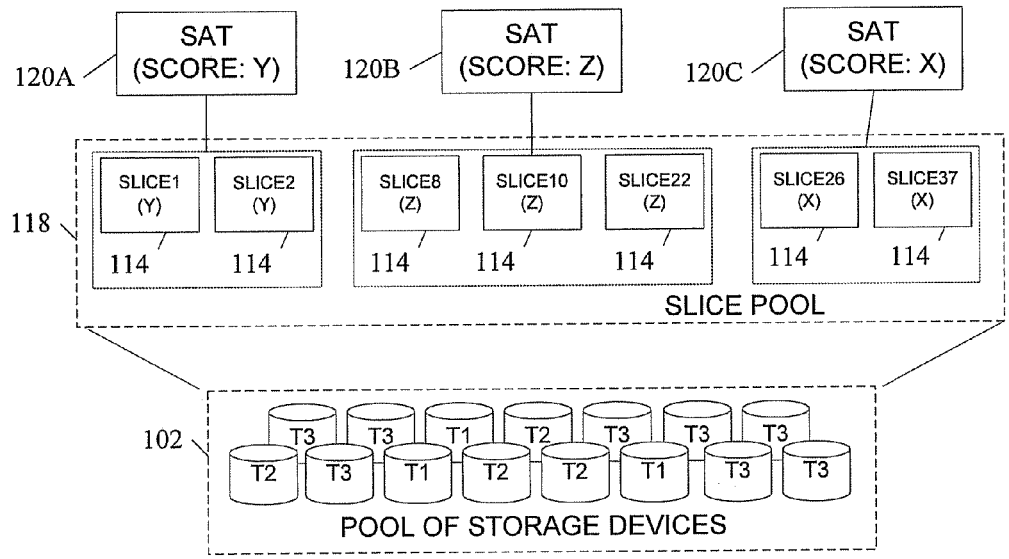
FIG. 2A is a block diagram illustrating a system using multiple slice allocation tables according to an embodiment of the subject matter described herein.

FIG. 2A is a block diagram illustrating a system using multiple SATs according to an embodiment of the subject matter described herein. Referring to FIG. 2A, multiple SATs 120 are associated with available slices 114 in slice pool 118.

In one embodiment, a component of a storage system (e.g., a slice manager or a storage processor 106) may determine all available or unallocated slices 114 of storage area (e.g., at initialization or run-time). The system component may sort slices 114 into SATs 120. In one embodiment, slices 114 are associated with SATs 120 based on storage devices 102, or storage media therein. For example, slice1 114 and slice2 114 may include storage area of a particular physical disk 102. An SAT may contain information about slice1 114, slice2 114 and any other slice of physical disk 102. In a second embodiment, slices 114 are associated with SATs 120 based on storage characteristics, such tiers or RG groups. For example, an SAT may contain information about slices of storage from storage media that is of a same or similar tier.

Slices 114 and SATs 120 may be associated with one or more scores. A score is generally a single attribute or value representing storage performance or allocation preference (e.g., higher score is more desirable storage). In one embodiment, a slice score may be determined using characteristics of the slice. Example of factors that may affect storage performance include factors related to an associated resource, factors related to system configuration, capacity of an associated storage device, access speed of an associated storage device, type of an associated storage device, physical location of slice on an associated storage device, amount of free space available on an associated storage device, amount of input/output (I/O) load on an associated storage device, preference for or affinity to a resource, physical distance between storage and client, speed and level of activity on communications bus or other resources used in communicating with an associated storage device, overhead cost of using resources (e.g., overhead cost of RAID algorithms involving an associated physical disk), and whether an associated storage device or other resources associated with an associated storage device are experiencing problems or in degraded modes. Resources can include any physical or logical component in storage system, such as storage devices, redundant array of independent disks (RAID) groups, tiers, communications buses, logical units, and slices. In one embodiment, a score may change based on one or more factors affecting storage performance changing. For example, as the system runs, a score for a given slice 114 may change as free space on an associated physical disk 102 is exhausted and as input/output (I/O) load on the disk increases.

In the embodiment illustrated in FIG. 2A, each SAT 120 is associated with one or more scores corresponding to associated slices 114. For example, an SAT 120 may have a score that corresponds to associated slices. In one embodiment, a SAT score may be equivalent or substantially equivalent to scores of associated slices. In a second embodiment, a SAT score may indicate the score of the lowest or least desirable slice in SAT 120.

Referring to FIG. 2A, SAT 120A is associated with slice1 114 and slice2 114. Slice1 114, slice2 114, and SAT 120A are associated with score Y. SAT 120B is associated with slice8 114, slice10 114 and slice22 114. Slice8 114, slice10 114, and slice22 114, and SAT 120B are associated with score Z. SAT 120C is associated with slice26 114 and slice37 114. Slice26 114, slice37 114, and SAT 120C are associated with score X.

An adaptive block allocation (ABA) mechanism (e.g., at a storage processor 106) may select a slice 114 for allocation using one or more scores. In one embodiment, selecting a slice for allocation using the scores includes selecting a SAT 120 associated with a desired score, and selecting a slice from the SAT 120. In this embodiment, ABA mechanism can select slices by inspecting SAT scores without having to individually inspect every slice score. For example, in FIG. 2A, if the highest score currently available is desirable, ABA mechanism may inspect the three scores associated with SATs 120A-C, determine that SAT 120B has the highest score, and allocate a slice 114 (e.g., slice8 114) from SAT 120B, without having to check the scores associated with each of the eight slices 114.

Figure 2B:
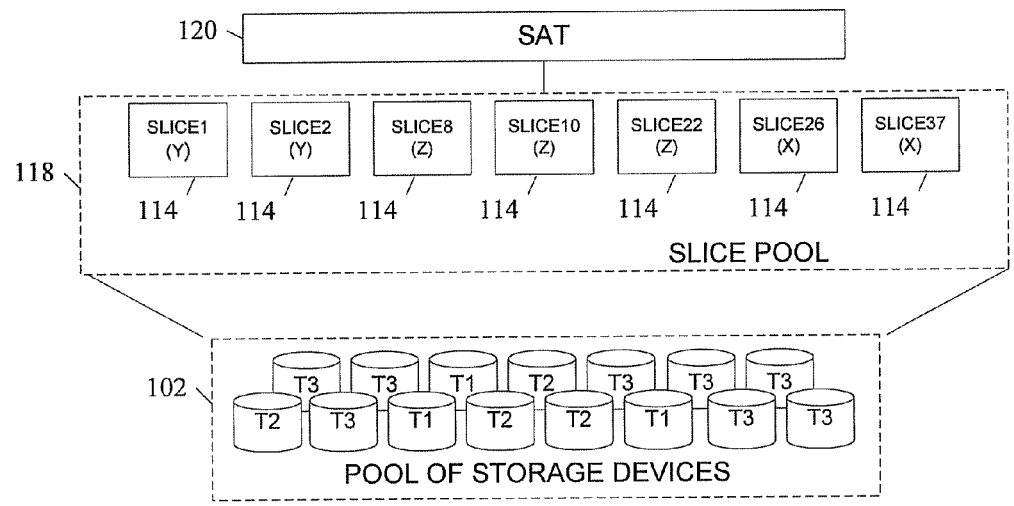
FIG. 2B is a block diagram illustrating a system using one slice allocation table according to an embodiment of the subject matter described herein.

FIG. 2B is a block diagram illustrating a system for an adaptive block allocation mechanism using one slice allocation table according to an embodiment of the subject matter described herein. Referring to FIG. 2A, a SAT 120 is associated with available slices 114 in slice pool 118.

In the embodiment illustrated in FIG. 2B, each slice 114 has a score associated with it. SAT 120 contains slice-related information for all slices 114. An adaptive block allocation (ABA) mechanism (e.g., at a storage processor) may select a slice 114 for allocation using the scores. In one embodiment, selecting a slice 114 for allocation using the scores may include inspecting a score for each slice 114 and selecting a slice 114 associated with a desired score. For example, in FIG. 2B, if X=75, Y=85, and Z=95 and a requesting entity (e.g., a TLU driver) requests a slice 114 having the highest score, slice8 114, slice10 114, and slice22 114 may each be suitable to allocate. ABA mechanism may allocate any one of the slices. In a second example, where a desired score is a particular score or greater, ABA mechanism may allocate the first slice that meets the requirements.

In one embodiment, SAT 120 may be a prioritized data structure (e.g., a list of slices based on scores in descending order), such that slices having desired scores (e.g., the highest scores) may be quickly identified. For example, if slices 114 are in descending order by their scores and desired scores are the highest scores currently available, ABA mechanism may allocate slices 114 from the top of the list.

Figure 3:
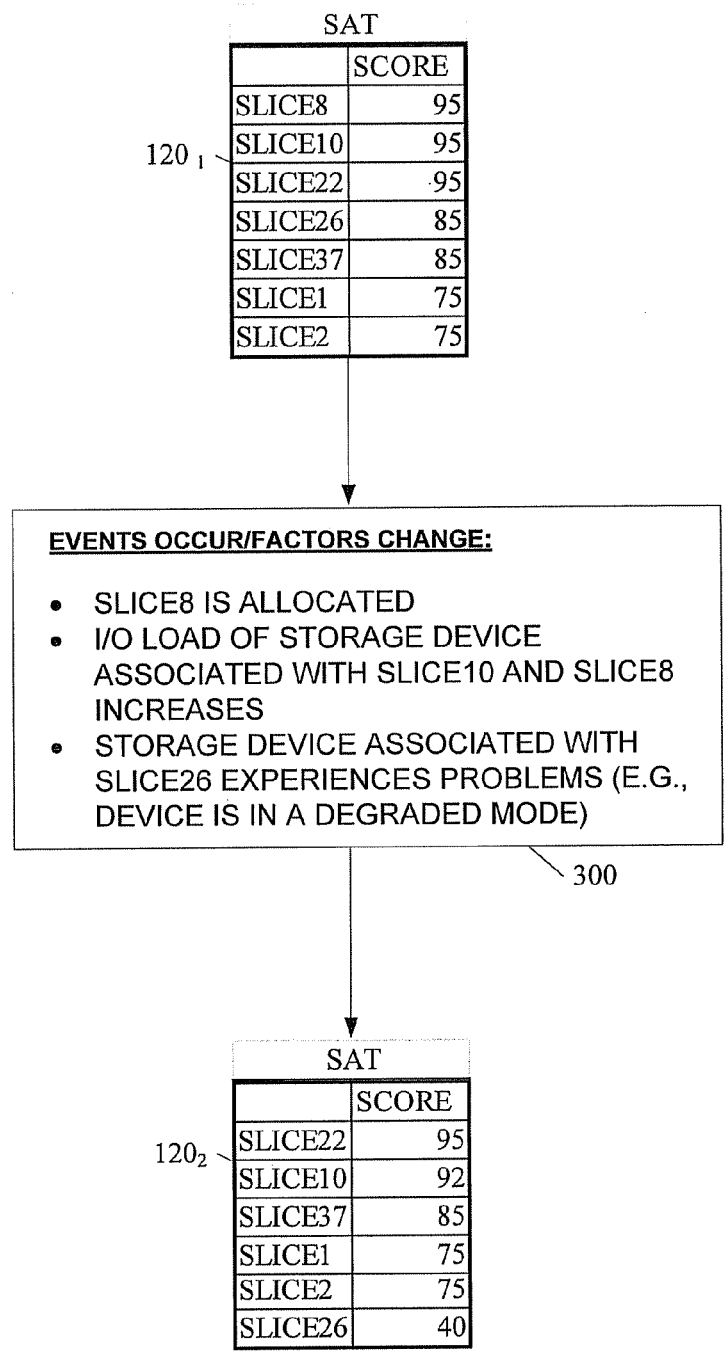
FIG. 3 is a block diagram illustrating adaptive scores for slices according to an embodiment of the subject matter described herein.

FIG. 3 is a block diagram illustrating adaptive scores for slices according to an embodiment of the subject matter described herein. Referring to FIG. 3, an SAT 120 is shown at two different points in time. SAT 120₁ is SAT 120 at an initial time and SAT 120₂ is SAT 120 at a later time after events 300 occurs. Scores associated with slices are depicted in each snapshot of SAT 120. In the embodiment illustrated in FIG. 3, one or more scores change based on storage performance factors changing in response to events 300.

Scores for slices, storage entities, and SATs 120 may be determined by one or more scoring policies. Scoring policies may assign values and weights to characteristics or factors that affect storage performance. As such, scores may change if a scoring policy changes. In one embodiment, a scoring policy may be configured for the system at design or run-time. In other embodiments, a scoring policy may be pluggable. Scoring policies may use dynamic and hard-coded values in determining scores. For example, physical and configuration properties of physical disk, such as access speed, type of disk, RAID configuration, tier, and storage capacity, of physical disk may be based on hard-coded values in a scoring policy. Other characteristics of physical disk, such as amount of free space available, amount of I/O load, and speed of a communications bus, may be calculated or determined dynamically (e.g., using feedback from the storage system).

In one embodiment, a performance score for a slice or storage entity is determined at an initial time (e.g., at system initialization). The initial PS (IPS) value may be based on physical properties of an associated storage device, such as access speed of storage medium, storage medium type, and storage medium capacity, which do not normally change. In one embodiment, an IPS for a slice may be based on scores associated with a storage device or storage medium. For example, a scoring policy may have hard-coded scores for particular storage media. In particular, a flash memory may have a score of "X" in this policy. A slice from memory, thus, may have an IPS of "X" or "$X_{prime}$". It will be appreciated that slices from a particular storage device may have varying scores based on factors affecting storage performance of individual slices (e.g., location of storage represented by slice on a disk, such as outside or inside edge of a disk platter, may affect the score).

In one embodiment, a PS for a given slice may be derived based on an upper limit (e.g., a highest score that the slice may receive). That is, a PS may represent a maximum performance score for a slice or associated storage device which decreases as system runs. For example, at an initial time where no slices of a storage device are allocated and all storage space on storage device is free, slices may have PS that is a maximum performance score associated with storage device. As slices of storage device are allocated and I/O load for storage device increases, scores of slices may change to correspond with performance degradation. In other words, scores may change to reflect current storage performance of a slice (or associated storage entity).

Two or more scores may be associated with a slice. In one embodiment, each slice is associated with a first score, wherein the first score is generally static and determined using characteristics of the slice that typically do not change. In a second embodiment, determining the first score may include using or incorporating observed performance metrics. For example, a test or diagnostic may be performed on a physical disk to measure real-world performance. A statically assigned first value may be compared with the observed metrics. In one example, the first score may be a function of both the statically assigned score and a score associated with the observed metrics, such as an average of the two scores. In a second example, if statically assigned score or score associated with observed metrics is determined to be unavailable, undeterminable, incomplete, redundant, or the like, the available or relevant information may be solely used in determining the first score. A second score may be initially derived from the first score, the second score changing as slices are allocated, wherein the second score is determined using characteristics of the slice that typically change. For example, each slice may store a maximum performance score based on a storage medium from which storage represented by slice is a part and a second score which starts as an IPS but changes to reflect current effective performance.

In the embodiment illustrated in FIG. 3, slices of SAT $120_1$ represents slice scores at an initial time. As shown, slice8, slice10, and slice22 have scores of 95. Slice26 and slice37 have scores of 85. Slice1 and slice2 have scores of 75. Slices having a same score may be of storage media of one or more storage devices. For example, slices having a same score may be of storage media that is from a same tier or storage class (e.g., slice8, slice10, and slice22 may be of flash disks that are tier 1 storage).

Events 300 represent actions which affect storage performance. Referring to events 300, slice8 is allocated. I/O load of a physical disk associated with slice8 and slice10 increases (e.g., disk may start receiving I/O related to newly allocated slice8). Additionally, a storage device associated with slice26 experiences problems and is in a degrade mode. Such events may have occurred at any time, including simultaneously, concurrently, or in a period of time. It will be also be appreciated that events may or may not correspond to server actions (e.g., I/O requests, compression requests, etc). For example, an event (e.g., a disk failure) affecting scores may occur without a server action. In other examples, an event may correspond to a partial server action, one server action, or multiple server actions.

Storage system may include monitoring functionality (e.g., at management module) which may monitor and inform one or more system components if storage performance or related factors change. ABA mechanism may use such factors in determining score. In particular, a scoring function, which will be described further below, may use such factors in determining an appropriate score for slices affected.

In the embodiment illustrated in FIG. 3, SAT $120_2$ depicts scores of slices after events 300. As shown, slice8 has been removed from SAT $120_2$. The scores associated with slice10 and slice26 have been lowered from SAT $120_1$. In particular, score associated with slice10 has been slightly affected by increased I/O load of associated physical disk, while score associated with slice26 has been significantly affected by an associated physical disk being in a degraded mode. Scores associated with slice22, slice37, slice1, and slice2 are unchanged.

In order to reflect current storage performance accurately and efficiently, scores may be determined at various times and in various ways. In one embodiment, scores may be determined periodically or dynamically. For example, scores may be updated at time intervals, after a certain number of transactions, and by request of a management component or system operator. In a second example, scores may be determined dynamically in response to one or more factors that affects performance changing. In a second embodiment, scores may be determined in response to a slice allocation request. For example, receiving a slice allocation request may trigger a score determination for use with a'subsequent slice allocation request and selection.

It will be appreciated that while FIG. 3 shows scores as positive integers, such numerical representation is for illustration. Scores may be any measures or values, including numeric fractions, non-numbers, signs, and colors. For example, scores may be determined using alphabetic notations (e.g., A-Z), arrows, or color codes. It will be further appreciated that scores may vary based on scoring policy, timing, and factors affected. For example, one scoring policy may only use I/O load, tier, and capacity of an associated disk in determining scores for slices. As such, in this example, other factors that change may have no affect on scores. In a second example, a score may not be completely affected (e.g., score may drop progressive over time or may not drop at all initially) until a threshold is reached or surpassed. That is, for example, an I/O load for a storage device, may cause a score to drop only if I/O load is extremely high (e.g., a load depth averaging over 100 I/O requests waiting to be processed) for a certain period of time, such as ten minutes.

Figure 4:
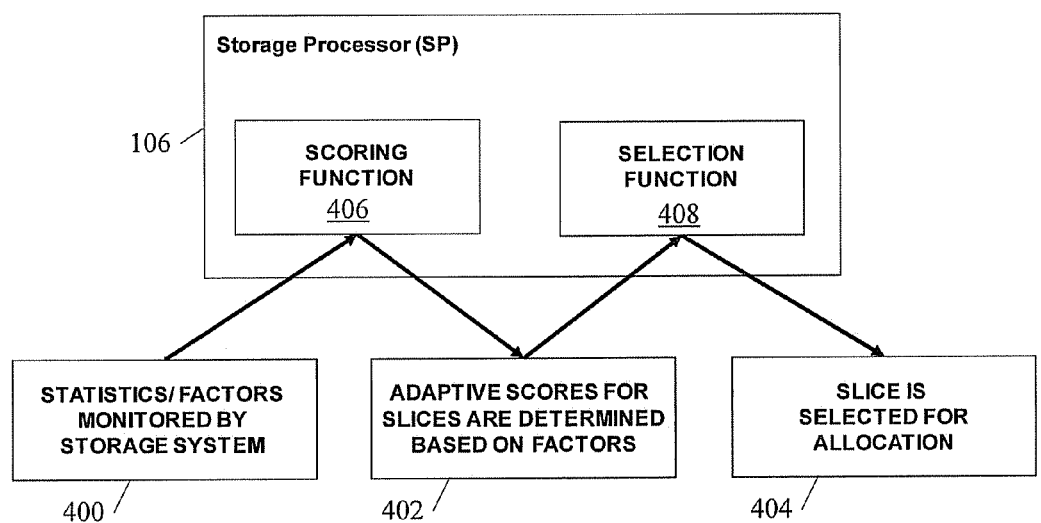
FIG. 4 is a block diagram illustrating components in a system for an adaptive block allocation mechanism according to an embodiment of the subject matter described herein.

FIG. 4 is a block diagram illustrating components in a system for an adaptive block allocation mechanism according to an embodiment of the subject matter described herein. ABA mechanism may be logically organized into one or more functions. Additionally, one or more functions may be implemented at one or more system components or nodes. For example, a scoring function for determining one or more scores associated with one or more slices may be implemented at a management module within storage system and a selection function for allocating slices may be implemented at a separate storage processor or a mapped LUN (MLU) driver.

In the embodiment illustrated in FIG. 4, a system for an ABA mechanism is organized into a scoring function 406 and selection function 408 at a storage processor 106. Scoring function 406 is for determine one or more scores associated with one or more slices. Selection function 408 is for selecting a slice for allocation using the scores.

Scoring function 406 may use information related to storage performance in determining one or more scores. In one embodiment, storage performance and related factors may be monitored by one or more system components. In one example, storage processor 106 may query storage device drivers or RAID group drivers for information related to storage performance. In a second example, a monitoring function at one or more system components may automatically or periodically send information to an applicable node or repository. In examples where factors or statistics are stored (e.g., where score determinations are not performed immediately), a system component (e.g., a performance manager module or node) may receive and store information related to storage performance. An ABA mechanism may retrieve or access the stored information in determining scores when performing score determinations.

Referring to FIG. 4, statistics and factors 400 are monitored by storage system. Such factors may be used by scoring function 406 in determining scores associated with logical portions of storage area (e.g., slices). Using scoring policies or other methods, scoring function 406 may determine scores. Such score determinations may occur multiple times as system runs. For example, scoring function 406 may determine an IPS for each slice at system initialization and update the scores periodically, dynamically, or in response to an allocation request. In one embodiment, scores may be adaptive to reflect associated storage performance. For example, scores may be a single attribute that represents a current effective performance associated with a slice. Referring to FIG. 4, adaptive scores 402 may be based on factors used by scoring function 406. Scores 402 may be stored in one or more SATs.

Selection function 408 may use information in one or more SATs in selecting slices for allocation. In one embodiment, scores 402 associated with slices may be used in selection process. In one example, selection function 408, or other component, may inspect one or more scores 402 associated with slices. If a requesting entity provides a desired score in a slice allocation request, a slice having the desire score may be selected. Alternatively, if a desired score is not provided, selection function 408 may select slices based on other criteria or rules, such as specified by an allocation policy. For example, a selection function 408 may use an allocation policy which may specify selecting a slice based on highest score currently available or lowest score currently available for meeting quality of service (QoS) requirements.

Scores 402 associated with slices may also include scores associated with SATs. In one embodiment, one or more SATs have scores corresponding to associated slices. For example, each SAT score may indicate that slices in SAT have equivalent scores. In a second example, each SAT score may indicate the score of the lowest or least desirable slice in the SAT.

Selection function 408, or other component, may inspect one or more scores 402 associated with SATs. In an embodiment, where SAT score equals slice scores 402 in the SAT, selection function 408 may only inspect the SAT scores. For example, if a requesting entity provided a desired score 402 in a slice allocation request, a SAT having the desire score 402 may be selected and a slice from that the SAT may be selected. Alternatively, if a desired score is not provided, selection function 408 may select SATs based on other criteria or rules. In other embodiments, where a SAT score does not equal slice scores 402 in the SAT, a selection function 408 may inspect both SAT scores and slice scores in selecting a slice for allocation. As such, it will be appreciated that ordering or prioritizing slices (e.g., by grouping into SATs and/or ordering slices of SAT based on slice score 402) will allow the selection function 408 to more efficiently select slices.

Referring to FIG. 4, selection function 408 selects a slice 404 for allocation using the scores 402. For example, selection function 408 receives a slice allocation request related to a TLU. The slice allocation request may specify a score of "80" or higher. Selection function 408 may inspect scores and select a slice 404 for allocation to the TLU. It will be appreciated that allocating slice 404 may trigger one or more factors to change which may cause scoring function 406 to determine new scores 402.

Figure 5:
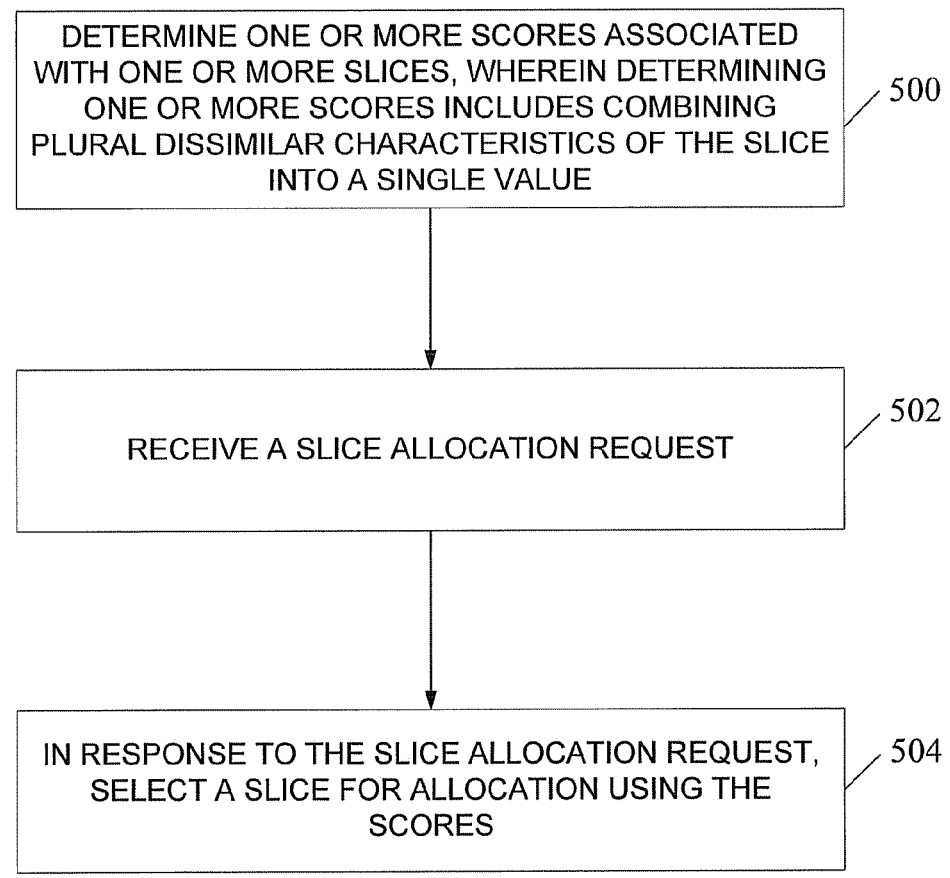
FIG. 5 is a block diagram illustrating an exemplary process for allocating slices of storage in a storage medium based on scores according to an embodiment of the subject matter described herein.

FIG. 5 is a block diagram illustrating an exemplary process for allocating slices of storage area in a storage medium based on scores according to an embodiment of the subject matter described herein.

One of more elements or steps in a process for allocating slices of storage area in a storage medium may be performed at one or more modules, functions, or nodes. In one embodiment, the exemplary process illustrated in FIG. 5 may occur at a storage processor for controlling access to a storage medium divided into a plurality of logical slices of storage.

At block 500, one or more scores associated with one or more slices are determined. Determining one or more scores includes combining plural dissimilar characteristics of the slice into a single value. For example, a scoring policy may determine a single attribute or value for slice by providing weights and values to various characteristics of the slice. The scoring policy may specify, for example, I/O load of a physical disk is 40% of a cumulative score and tier or RG group of the physical disk is 60% of the cumulative score. Each characteristic may have a unique scale or normalizing factor for determining a value to use in score computation. For example, I/O load may be based on throughput or queue depth and RG group or tier may be determined by a system operator or static physical characteristics. To determine an I/O load value for a physical disk, the value may be based relative to other I/O load of storage devices. The value related to tier may based on hard-coded values designated at run-time by operator.

At block 502, a slice allocation request is received. The request for allocation may be an explicit allocation request, or it may be an implicit allocation request. An I/O write request is an example of the latter, since a storage processor may allocate additional storage space, if needed, to store the data being written. For example, a write request may be received from a host (e.g., a virtualization server (e.g., a VMWare ESX server) or other system). The write request may be related to a thinly-provisioned LUN or TLU. Upon receipt of the write request from the host, the storage processor may then determine whether there is enough space already allocated to the TLU to store the data being written, and if not, initiate a slice allocation request to an ABA mechanism. In a second example, an allocation may be trigged by other activities, such as a restore request or a read request, involving the TLU. The TLU or another system component may notice that the TLU is low on free space and may trigger a slice allocation request.

At block 504, in response to the slice allocation request, a slice for allocation is selected using the scores. In one embodiment, selection using scores may include selecting a slice with a desired score. A desired score may be based on one or more factors. For example, a desire score may be based on information of the slice allocation request. In a second example, a desired score may be based on an allocation policy (e.g., slices may be allocated based on highest scores currently available). Selecting a slice may include inspecting scores associated with slices and SATs. In one embodiment, selecting a slice for allocation using the scores includes selecting a slice list associated with a desired score and selecting a slice from the slice list.

It will be understood that various details of the subject matter described herein may be changed without departing from the scope of the subject matter described herein. Furthermore, the foregoing description is for the purpose of illustration only, and not for the purpose of limitation.

What is claimed is:

1. A method for allocating slices of storage area in a storage medium based on scores comprising:
   at a storage processor for controlling access to a storage medium divided into a plurality of logical slices of storage prior to receiving a slice allocation request, wherein the slices are constant sized portions of the storage medium:
   determining one or more scores associated with one or more slices, wherein determining one or more scores includes combining plural dissimilar slice characteristics into a single value, wherein the one or more slices are associated with one or more slice lists, wherein each of the one or more slice lists is assigned a score based on the scores of the one or more slices associated with the slice list;
   receiving the slice allocation request; and
   in response to the slice allocation request, selecting a first slice for allocation using the one or more scores assigned to the one or more slice lists.

2. The method of claim 1 wherein the storage medium is one of a hard disk, a floppy disk, a tape, a solid state memory, an optical disc, and a flash memory.

3. The method of claim 1 wherein a first score associated with the first slice is determined periodically or dynamically.

4. The method of claim 1 wherein a first score associated with the first slice is determined in response to receiving a slice allocation request.

5. The method of claim 1 wherein slice characteristics include at least two of:
   a factor related to an associated resource;
   a factor related to system configuration;
   capacity of an associated storage device;
   access speed of an associated storage device;

type of an associated storage device;
physical location of slice on an associated storage device; and
amount of free space available on an associated storage device;
amount of input/output (I/O) load on an associated storage device;
preference for or affinity to a resource;
physical distance between storage and client;
speed and level of activity on communications bus or other resources used in communicating with an associated storage device;
overhead cost of using resources; and
whether an associated storage device or other resources associated with an associated storage device are experiencing problems or in degraded modes.

6. The method of claim 5 wherein resources include one of storage devices, arrays, redundant array of independent disks (RAID) groups, tiers, communications buses, logical units, and slices.

7. The method of claim 1 wherein each slice of the one or more slices is associated with a first score and a second score, wherein the first score is generally static and determined using slice characteristics that typically do not change, wherein the second score is initially derived from the first score and is determined using slice characteristics that typically change, the second score changing as slices are allocated.

8. The method of claim 7 wherein determining the first score includes using or incorporating observed performance metrics.

9. The method of claim 1 wherein the first slice is associated with a first score at an initial time, wherein the score is determined, at the initial time, using slice characteristics, the score changing based on slice characteristics changing.

10. The method of claim 1 wherein selecting the first slice for allocation using the one or more scores assigned to the one or more slice lists includes selecting the first slice associated with a desired score, wherein the desired score is based on one or more of the slice allocation request and an allocation policy.

11. The method of claim 1 wherein selecting the first slice for allocation using the one or more scores assigned to the one or more slice lists includes:
selecting, from the one or more slice lists, a first slice list associated with a desired score; and
selecting the first slice from the first slice list.

12. A system for an adaptive block allocation mechanism, comprising:
a storage processor configured for controlling access to a storage medium divided into a plurality of logical slices of storage prior to receiving a slice allocation request, wherein the slices are constant sized portions of the storage medium, the storage processor including:
a scoring function configured for determining one or more scores associated with one or more slices, wherein determining one or more scores includes combining plural dissimilar slice characteristics into a single value, wherein the one or more slices are associated with one or more slice lists, wherein each of the one or more slice lists is assigned a score based on the scores of the one or more slices associated with the slice list; and
a selection function configured for receiving the slice allocation request, and in response to the slice allocation request, selecting a first slice for allocation using the one or more scores assigned to the one or more slice lists.

13. The system of claim 12 wherein the storage medium is one of a hard disk, a floppy disk, a tape, a solid state memory, a disc, and a flash memory.

14. The system of claim 12 wherein a first score associated with the first slice is determined periodically or dynamically.

15. The system of claim 12 wherein a first score associated with the first slice is determined in response to receiving a slice allocation request.

16. The system of claim 15 wherein the slice characteristics include at least two of:
a factor related to an associated resource;
a factor related to system configuration;
capacity of an associated storage device;
access speed of an associated storage device;
type of an associated storage device;
physical location of slice on an associated storage device; and
amount of free space available on an associated storage device;
amount of input/output (I/O) load on an associated storage device;
preference for or affinity to a resource;
physical distance between storage and client;
speed and level of activity on communications bus or other resources used in communicating with an associated storage device;
overhead cost of using resources; and
whether an associated storage device or other resources associated with an associated storage device are experiencing problems or in degraded modes.

17. The system of claim 16 wherein resources include one of storage devices, arrays, redundant array of independent disks (RAID) groups, tiers, communications buses, logical units, and slices.

18. The system of claim 12 wherein the scoring function determines a first score and a second score for each slice of the one or more slices, wherein the first score is generally static and determined using characteristics of the slice that typically do not change, wherein the second score is initially derived from the first score and is determined using slice characteristics that typically change, the second score changing as slices are allocated.

19. The system of claim 18 wherein determining the first score includes using or incorporating observed performance metrics.

20. The system of claim 12 wherein the scoring function determines a score for each slice at an initial time using characteristics of the slice, the score changing based on characteristics of the slice changing the first slice is associated with a first score at an initial time, wherein the score is determined, at the initial time, using slice characteristics, the score changing based on slice characteristics changing.

21. The system of claim 12 wherein selecting the first slice for allocation using the one or more scores assigned to the one or more slice lists includes selecting the first slice associated with a desired score, wherein the desired score is based on one or more of the slice allocation request and an allocation policy.

22. The system of claim 12 wherein selecting the first slice for allocation using the one or more scores assigned to the one or more slice lists includes:
selecting, from the one or more slice lists, a first slice list associated with a desired score; and
selecting the first slice from the first slice list.

23. A non-transitory computer readable medium having stored thereon computer executable instructions that when executed by the processor of a computer perform steps comprising:
- determining one or more scores associated with one or more slices of storage of a storage medium, wherein the slices are constant sized portions of the storage medium and are determined prior to receiving a slice allocation request, wherein determining one or more scores includes combining plural dissimilar slice characteristics into a single value, wherein the one or more slices are associated with one or more slice lists, wherein each of the one or more slice lists is assigned a score based on the scores of the one or more slices associated with the slice list;
- receiving the slice allocation request; and
- in response to the slice allocation request, selecting a first slice for allocation using the one or more scores assigned to the one or more slice lists.

* * * * *